5,525,559A

United States Patent [19]

Metcalfe et al.

[11] Patent Number: 5,525,559
[45] Date of Patent: Jun. 11, 1996

[54] PREPARATION OF MIXED POWDERS

[75] Inventors: Mark S. Metcalfe, North Ormesby; Alan Dixon, Middlesbrough, both of England

[73] Assignee: Tioxide Specialties Limited, United Kingdom

[21] Appl. No.: 427,223

[22] Filed: Apr. 24, 1995

Related U.S. Application Data

[63] Continuation of Ser. No. 194,492, Feb. 10, 1994, abandoned.

[30] Foreign Application Priority Data

Feb. 13, 1993 [DE] Germany .................. 93 02 911.4

[51] Int. Cl.[6] ................................................ C04B 35/48
[52] U.S. Cl. .................. 501/103; 501/104; 501/105; 423/608
[58] Field of Search ................................ 501/103, 104, 501/105; 423/608

[56] References Cited

U.S. PATENT DOCUMENTS

| | | | |
|---|---|---|---|
| 3,522,064 | 7/1970 | Valdsaar | 501/103 |
| 4,542,110 | 9/1985 | Nakada et al. | 501/103 |
| 4,626,518 | 12/1986 | Watanabe et al. | 501/104 |
| 4,835,123 | 5/1989 | Bush et al. | 501/103 |
| 4,977,114 | 12/1990 | Horinouchi et al. | 501/103 |
| 5,017,531 | 5/1991 | Ukai et al. | 501/97 |
| 5,033,682 | 7/1991 | Braun | 241/16 |
| 5,155,071 | 10/1992 | Jacobson | 501/103 |
| 5,196,180 | 3/1993 | Hartshorn | 501/103 |
| 5,326,519 | 7/1994 | Claussen | 501/104 |
| 5,346,702 | 9/1994 | Na et al. | 424/490 |
| 5,352,459 | 10/1994 | Hollister et al. | 424/489 |
| 5,399,363 | 3/1995 | Liversidge et al. | 424/490 |

FOREIGN PATENT DOCUMENTS

| | | | |
|---|---|---|---|
| 0013599 | 1/1980 | European Pat. Off. . | |
| 0134136 | 8/1984 | European Pat. Off. . | |
| 0167723 | 1/1986 | European Pat. Off. | 501/103 |
| 0312932 | 10/1988 | European Pat. Off. . | |
| 0414575 | 8/1990 | European Pat. Off. . | |
| 60-155569 | 8/1985 | Japan . | |
| 2204327 | 8/1990 | Japan . | |
| 3-146454 | 6/1991 | Japan . | |
| 2234500 | 2/1991 | United Kingdom . | |
| 2260128 | 4/1993 | United Kingdom . | |
| WO89/01923 | 3/1989 | WIPO . | |
| WO9003838 | 4/1990 | WIPO . | |

*Primary Examiner*—Paul Marcantoni
*Attorney, Agent, or Firm*—Baker & Botts; James Remenick

[57] ABSTRACT

A method of preparing a mixture of zirconia and a stabilising agent for the zirconia comprises milling an aqueous suspension of particulate zirconia and particulate stabilising agent in a bead mill for at least 2 minutes in the presence of a particulate mixing medium having an average particle size from 0.2 mm to 3 mm. Preferred stabilising agents are oxides of yttrium, cerium, calcium or magnesium. Surprisingly, ceramics prepared from the product mixture are more resistant to degradation by attack from water above 100° C. than are ceramics prepared from coprecipitated powders.

19 Claims, No Drawings

PREPARATION OF MIXED POWDERS

This application is a continuation of application Ser. No. 08/194,492, filed Feb. 10, 1994 now abandoned.

This invention relates to a method of preparing powder mixtures and in particular to preparing mixtures of zirconia and stabilising agents for zirconia.

It is known that the incorporation of certain agents known as stabilising agents into a ceramic material based on zirconia can improve the strength of the ceramic by stabilising the zirconia in the tetragonal or cubic crystal habit.

Typical stabilising agents are yttria, alkaline earth oxides, and rare earth oxides and it is known to mix these agents with zirconia by several techniques. When powdered zirconia and powdered stabilising agent are mixed it is difficult to produce a homogeneous mixture even if the mixture is partially sintered and subsequently reground. A co-precipitate of zirconia and a stabiliser has been prepared from an aqueous solution of a compound of zirconium and a compound of the stabilising element and the co-precipitate is subsequently calcined and ground. Both these techniques are energy-intensive. An alternative technique which has been shown to produce zirconia which is suitable for forming ceramics having good physical properties is the formation of a coating of stabilising agent on particles of zirconia by precipitation of the agent from solution in the presence of dispersed particulate zirconia. This process, however, is relatively complex and involves several steps.

The present invention provides a simpler means of obtaining a mixture of zirconia and stabilising agent and the product of the invention is suitable for producing ceramics having physical and chemical properties similar to those produced from coated particulate zirconia.

According to the invention, a process for preparing a mixture of zirconia and a stabilising agent for the zirconia comprises forming an aqueous suspension containing particulate zirconia and particulate stabilising agent and agitating said suspension in a bead mill in the presence of a particulate mixing medium for at least 2 minutes, said mixing medium having an average particle size of from 0.2 mm to 3 mm.

The process of the invention can be operated as a batch process or a continuous process. In a batch process the aforementioned minimum time of 2 minutes refers to the time for which a batch is agitated in the bead mill. When the bead mill is operated continuously the minimum time of 2 minutes refers to the average residence time of the aqueous suspension in the mill.

It is preferred that the particulate zirconia and the particulate stabilising agent have a small particle size. A convenient technique for determining average particle size of a powder is measurement of the specific surface area of the powder by a BET nitrogen desorption method. Preferably the zirconia used in the process of the invention has a particle size such that the specific surface area as determined by this technique is greater than 1 $m^2/g$. More preferably, the specific surface area is from 5 to 25 $m^2/g$.

A particularly useful form of particulate zirconia is produced by the vapour phase oxidation of an oxidisable vapourised zirconium compound. Typical zirconium compounds which can be oxidised in the vapour state are the zirconium halides, particularly zirconium tetrachloride. The oxidation in the vapour state usually is carried out by mixing the zirconium chloride with an excess of heated oxygen under such conditions that oxidation of the zirconium tetrachloride takes place and the desired sized zirconia is obtained directly on cooling and separating from the gas stream. A preferred method of heating the oxygen to react with the zirconium tetrachloride is to pass the oxygen through an electric arc between two electrodes supplied with electrical power at an appropriate voltage and amperage which commonly generates a so-called electrical plasma flame. This form of manufacture of the particulate zirconia has an advantage in that the product is obtained in the oxide form directly and that the oxidation process can be controlled so as to control the particle size of the product. A product which is very useful for carrying out the process of the invention is formed by the oxidation of zirconium tetrachloride in a plasma flame and has a specific surface area of from 10 to 20 $m^2/g$.

The particulate stabilising agent preferably has an average particle size such that the specific surface area is greater than 1 $m^2/g$ and preferably greater than 5 $m^2/g$. It has been shown that particulate stabilising agents having a specific surface area about 50 $m^2/g$ can be used in the process of the invention to produce a useful mixture of zirconia and stabilising agent. Preferably, however, the specific surface area of the stabilising agent is less than 25 $m^2/g$.

It is, however, possible to utilise zirconia and/or stabilising agents having a particle size somewhat larger than these preferred ranges since the mill employed in the method of the invention is capable of reducing the particle size of powders. When it is desired to reduce the particle size of the zirconia and/or stabilising agent the period during which the suspension is agitated is adjusted to ensure the necessary size reduction. It is preferred that the period during which the suspension is agitated is such that at least 90 per cent by weight of the particulate stabiliser has a particle size less than 2 micrometers at the end of the period.

Alternatively, the zirconia and/or the stabilising agent can be separately milled to reduce the particle size before introducing them to the bead mill.

Suitable stabilising agents include yttrium oxides, oxides of the rare earth metals and oxides of alkaline earth metals. Preferably the stabilising agent is an oxide of yttrium, cerium, calcium or magnesium and the most preferable stabilising agent is yttrium oxide.

The proportions of zirconia and stabilising agent employed in the process of the invention depend upon the actual stabilising agent used and the desired degree of stabilisation to be imparted to the zirconia product. When the stabilising agent is yttrium oxide the amount used is usually less than 20 per cent by weight with respect to zirconia. Preferably the amount is from 3.5 to 15 weight per cent with respect to zirconia. When quantities at the lower end of this range are used the zirconia produced forms a sintered product which is only partially stabilised whereas larger amounts of yttrium oxide produce fully stabilised zirconia. When cerium oxide is used as a stabilising agent the amount is usually less than 28 per cent by weight with respect to zirconia and preferably from 3 to 24 weight per cent with respect to zirconia. Usually the amount of calcium or magnesium oxide used is less than about 9 per cent by weight with respect to zirconia and preferably is from about 1 to 8 per cent by weight with respect to zirconia. As with yttrium oxide, smaller quantities of oxides of cerium, calcium or magnesium produce partially stabilised zirconia ceramics.

An aqueous suspension of the particulate zirconia and the particulate stabilising agent is used and this may be formed by stirring the particulate materials with water. Preferably, however, a dispersing agent is added to aid the dispersion of the particulate material in the water. Generally, an organic dispersing agent is preferred and suitable dispersing agents include alkanolamines such as monoisopropanolamine and polymeric derivatives of acrylic acids such as ammonium polyacrylate.

When a dispersing agent is used it can be mixed with the particulate materials to form a fully dispersed system before agitation in the bead mill or, alternatively, the particulate materials may be partially dispersed initially and the agitation produced by the bead mill is relied upon to complete the dispersion process.

The equipment used to agitate the suspension of zirconia and stabilising agent is known as a bead mill and is characterised in that it uses a particulate mixing medium to effect agitation and mixing. This particulate mixing medium has an average particle size of from 0.2 mm to 3 mm. Preferably, the average particle size is from 0.5 mm to 1.5 mm and most preferably from 0.6 mm to 1.2 mm.

The particulate mixing medium is suitably sand, glass beads or ceramic beads. Preferably, ceramic beads formed from yttria stabilised zirconia are used as the mixing medium.

In the process of the invention, the aqueous suspension is agitated in the bead mill for at least 2 minutes. The optimum period for which the aqueous suspension is agitated depends upon a number of factors including the design and efficiency of the mill used, and the concentration of the suspension. Generally, it is preferable to agitate for at least 5 minutes and frequently agitation continues for at least 8 minutes. Usually, agitation for greater than 30 minutes will produce no additional benefit.

As hereinbefore stated the time for which the aqueous suspension is agitated can refer to the time for which a batch is agitated or to the average residence time for a continuous process. It is sometimes convenient to pass the aqueous suspension through the bead mill more than once or to pass it through more than one bead mill. In such circumstances the time of agitation refers to the total time or total average residence time for which the aqueous suspension is agitated.

Suitable bead mills include those equipped with one or more agitators and particularly useful are those mills which operate at high speed. For example, mills which operate at a speed of 1000 to 6000 revolutions per minute are suitable and typically a speed of 2500 revolutions per minute is used. Agitator mills in which the tip speed of the agitator is 10 meters per second or greater are of use. If desired the bead mill can be cooled.

If required, other additives which are conventionally used in ceramic compositions such as sintering aids, binders or colours can be added to the aqueous suspension before, during or after the suspension is agitated in the bead mill.

After agitation in the bead mill the particulate mixing medium is separated from the aqueous suspension and the mixture of zirconia and stabilising agent is usually dried to form a powder which is suitable for forming ceramic articles by shaping and firing. The mixture may be separated from the water by, for example, filtration and subsequently dried by heating but, preferably, the suspension is passed to a spray dryer for conversion to a dried powder.

The mixed powder is eminently suitable for producing ceramic articles having good physical and chemical properties. In particular the fired ceramics have shown a resistance to degradation in the presence of water above 100° C. which is similar to the resistance shown by ceramics produced from coated zirconia particles and better than the resistance shown by ceramics produced from coprecipitated zirconia/yttrium oxide.

The invention is illustrated by the following examples.

EXAMPLE 1

A slurry containing water, zirconia (specific surface area 12 m$^2$/g), yttria (supplied by Meldform, specific surface area 9 m$^2$/g) and dispersant (ammonium polyacrylate sold under the Trade Name Dispex A40) was prepared. The yttria level was 4.7% by weight of the total solids content. The dispersant level was 0.5% by weight of the total solids content. The total solids content was 40% by weight of the total slurry weight.

The slurry was agitated by passing the slurry through a bead mill (Netzsch LME4) operating at 2400 revolutions per minute. The mill (4 liter capacity) was loaded with 12 kg of 1.0 mm yttria stabilised zirconia beads. The residence time of the slurry in the bead mill was 8 minutes.

After spray-drying using a rotary atomiser (Niro Production Minor) at 15,000 revolutions per minute with an inlet temperature of 230° C. the yttria/zirconia powder was pressed into pellets and sintered. The pellets had a density of 6.04 g. cm$^{-3}$.

Sintered pellets were tested for resistance to corrosion by immersing them in distilled water in an autoclave at 180° C. and 10.0 bar following the method of Nakajima et al., Advances in Ceramics, Vol. 12, pages 399–403 (1984). After 50 hours exposure to these conditions there was no visible sign of attack on the pellets.

For comparison pellets prepared from zirconia powder, the particles of which had been coated with 4.7% by weight yttria were also tested in distilled water for 50 hours at 180° C. Again no visible sign of corrosion was detected.

However, pellets which were prepared from a co-precipitated zirconia/yttria powder containing a similar amount of yttria were found to have lost all strength after less than 24 hours exposure to water at 180° C.

EXAMPLE 2

Example 1 was repeated except that 0.25% by weight of alumina (supplied by Alcoa, specific surface area 11 m$^2$/g) with respect to solids was also added to the slurry.

The sintered pellets produced had a density of 6.03 g. cm$^{-3}$ and showed no visible sign of attack after 150 hours exposure to water at 180° C.

Pellets having a similar composition but prepared from zirconia powder having an yttria coating on the particles also showed no visible sign of attack after 150 hours exposure at 180° C. but pellets prepared from a coprecipitated zirconia/yttria powder and also containing 0.25% alumina lost all strength when exposed to water at 180° C. for 24 hours.

EXAMPLE 3

A slurry containing water, zirconia, yttria, alumina (as used in Examples 1 and 2) and dispersant (Dispex A40) was prepared. The yttria level was 4.5% by weight of the total solids content. The alumina level was 0.25% by weight of the total solids content. The dispersant level was 1.0% by weight of the total solids content. The total solids content was 40% by weight of the total slurry weight.

The slurry was agitated in a lab scale attritor mill (Netzsch PE075) operating at 485 revolutions per minute, a tip speed of 100 m min$^{-1}$. The mill (440 ml capacity) was loaded with 1.6 kg of 1.0 mm yttria stabilized zirconia beads. The residence time of the slurry in the attritor mill was 30 minutes.

The zirconia beads were removed from the suspension and the mixed slurry was oven-dried at 110° C. for 8 hours.

After drying the yttria/zirconia/alumina powder was pressed into pellets and sintered. The pellets had a density of 6.07 gcm$^{-3}$.

The resistance to corrosion of the pellets was tested as in Example 1. No visible sign of attack on the pellets was observed after exposure to water at 180° C. for 150 hours.

We claim:

1. A process for preparing a mixture of zirconia and a stabilizing agent for said zirconia comprising forming an aqueous suspension containing particulate zirconia having a surface area of between about 5 to 25 meters squared per gram as determined by BET nitrogen desorption and particulate stabilizing agent having a surface area of between about 1 to 50 meters squared per gram as determined by BET nitrogen desorption, and agitating said suspension in a bead mill in the presence of a particulate grinding medium for at least 2 minutes, said mixing medium having an average particle size of from 0.2 mm to 3 mm.

2. A process according to claim 1 in which the particulate zirconia is produced by vapour phase oxidation of a vapourised zirconium compound.

3. A process according to claim 2 in which the zirconium compound is zirconium tetrachloride and is oxidised in a plasma flame and the zirconia produced has a specific surface area of from 10 to 20 meters squared per gram as determined by BET nitrogen desorption.

4. A process according to claim 1 in which the suspension is agitated for a period of time which is selected so as to reduce the average particle size of the particulate materials in the suspension so that at least 90 per cent by weight of the particles of stabilising agent have a size of less than 2 micrometers at the end of the period.

5. A process according to claim 1 in which the zirconia or the stabilising agent is milled to reduce the particle size before addition to the bead mill.

6. A process according to claim 1 in which the particulate mixing medium has an average particle size of from 0.6 mm to 1.2 mm.

7. A process according to claim 1 in which the particulate mixing medium is selected from the group consisting of sand, glass beads and ceramic beads.

8. A process according to claim 7 in which the ceramic beads are formed from yttria stabilised zirconia.

9. A process according to claim 1 in which the suspension is agitated in the bead mill for a period of from 5 to 30 minutes.

10. A process according to claim 1 in which the stabilising agent is an oxide selected from the group consisting of oxides of yttrium, cerium, calcium and magnesium.

11. A process according to claim 10 in which the stabilising agent is yttrium oxide and is present in an amount of from 3.5 to 15 per cent by weight with respect to zirconia.

12. A process according to claim 10 in which the stabilising agent is cerium oxide and is present in an amount of from 3 to 24 per cent by weight with respect to zirconia.

13. A process according to claim 10 in which the stabilising agent is selected from the group consisting of calcium oxide and magnesium oxide and is present in an amount of from 1 to 8 per cent by weight with respect to zirconia.

14. A process according to claim 1 in which the bead mill is operated at a speed of from 1000 to 6000 revolutions per minute.

15. A process according to claim 1 in which a dispersing agent is added to the aqueous suspension.

16. A process according to claim 15 in which the dispersing agent is selected from the group consisting of alkanolamines and polymeric derivatives of acrylic acids.

17. A process according to claim 1 in which the aqueous suspension is passed through the bead mill more than once or is subjected to agitation in more than one bead mill.

18. A process according to claim 1 in which a dry mixture of zirconia and stabilising agent is formed by passing the aqueous slurry from the bead mill to a spray dryer.

19. A process according to claim 1 in which an additive selected from the group consisting of sintering aids, binders and colours is added to the aqueous suspension.

* * * * *

UNITED STATES PATENT AND TRADEMARK OFFICE
CERTIFICATE OF CORRECTION

PATENT NO. : 5,525,559
DATED : June 11, 1996
INVENTOR(S) : Mark S. METCALFE et al.

It is certified that error appears in the above-indentified patent and that said Letters Patent is hereby corrected as shown below:

Title Page

Item [30], delete "[DE] Germany" and insert therefor --[GB] Great Britain--.

Signed and Sealed this

Second Day of September, 1997

Attest:

BRUCE LEHMAN

Attesting Officer

Commissioner of Patents and Trademarks